(12) United States Patent
Oggioni

(10) Patent No.: US 7,915,540 B2
(45) Date of Patent: Mar. 29, 2011

(54) TAMPER-PROOF STRUCTURES FOR PROTECTING ELECTRONIC MODULES

(75) Inventor: Stefano Sergio Oggioni, Melano (IT)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 11/680,120

(22) Filed: Feb. 28, 2007

(65) Prior Publication Data
US 2008/0036598 A1 Feb. 14, 2008

(30) Foreign Application Priority Data
Jun. 9, 2006 (EP) .................................... 06300572

(51) Int. Cl.
*H01R 12/04* (2006.01)
(52) U.S. Cl. .............................. 174/261; 29/846; 29/849
(58) Field of Classification Search .................. 174/261; 29/846, 849
See application file for complete search history.

(56) References Cited

U.S. PATENT DOCUMENTS

| | | | | |
|---|---|---|---|---|
| 3,851,602 | A | * 12/1974 | Lamping | ......................... 109/23 |
| 2005/0161253 | A1 | * 7/2005 | Heitmann et al. | ............. 174/261 |
| 2006/0086534 | A1 | 4/2006 | Oggioni et al. | |

* cited by examiner

*Primary Examiner* — Hung S. Bui
*Assistant Examiner* — Steven Sawyer
(74) *Attorney, Agent, or Firm* — Yuanmin Cai

(57) ABSTRACT

A tamper-proof structure for protecting an electronic module, comprising a pattern of signal lines having a highly unpredictable layout, which is an approximation of a space-filling curve obtained by the replication of at least one elementary space element having an inscribed base curve inscribed therein. The base curve is adapted, by replication of the elementary space element, to generate an approximation of an at least two-dimensional space-filling curve, the replication being such that an end of the base curve in one elementary space element is connected to the end of the base curve in another, adjacent elementary space element of the replication.

11 Claims, 10 Drawing Sheets

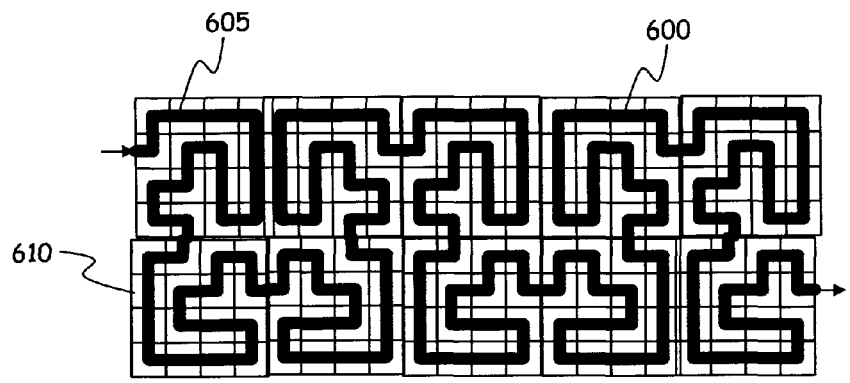
Fig. 6
| 1 | 2 | 3 | 4 | 1 | 2 | 3 | 4 | 1 | 2 | 3 | 4 | 1 | 2 | 3 | 4 |
|---|---|---|---|---|---|---|---|---|---|---|---|---|---|---|---|
| 8 | 7 | 6 | 5 | 8 | 7 | 6 | 5 | 8 | 7 | 6 | 5 | 8 | 7 | 6 | 5 |
| 9 | 10 | 11 | 12 | 9 | 10 | 11 | 12 | 9 | 10 | 11 | 12 | 9 | 10 | 11 | 12 |
| 16 | 15 | 14 | 13 | 16 | 15 | 14 | 13 | 16 | 15 | 14 | 13 | 16 | 15 | 14 | 13 |
| 1 | 2 | 3 | 4 | 1 | 2 | 3 | 4 | 1 | 2 | 3 | 4 | 1 | 2 | 3 | 4 |
| 8 | 7 | 6 | 5 | 8 | 7 | 6 | 5 | 8 | 7 | 6 | 5 | 8 | 7 | 6 | 5 |
| 9 | 10 | 11 | 12 | 9 | 10 | 11 | 12 | 9 | 10 | 11 | 12 | 9 | 10 | 11 | 12 |
| 16 | 15 | 14 | 13 | 16 | 15 | 14 | 13 | 16 | 15 | 14 | 13 | 16 | 15 | 14 | 13 |
Fig. 7
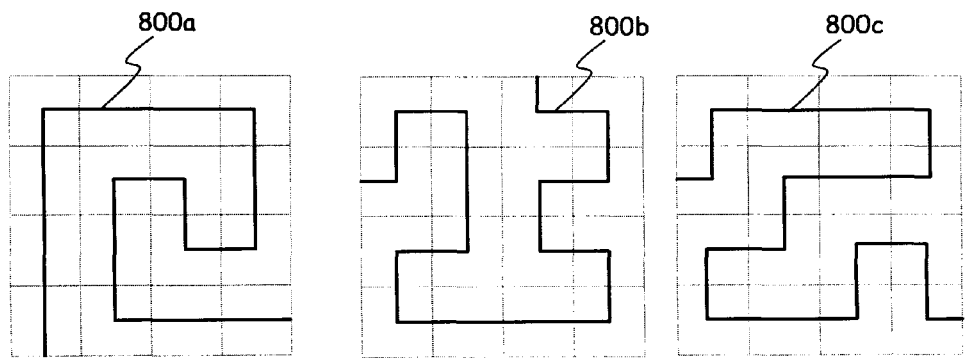
Fig. 8A    Fig. 8B    Fig. 8C

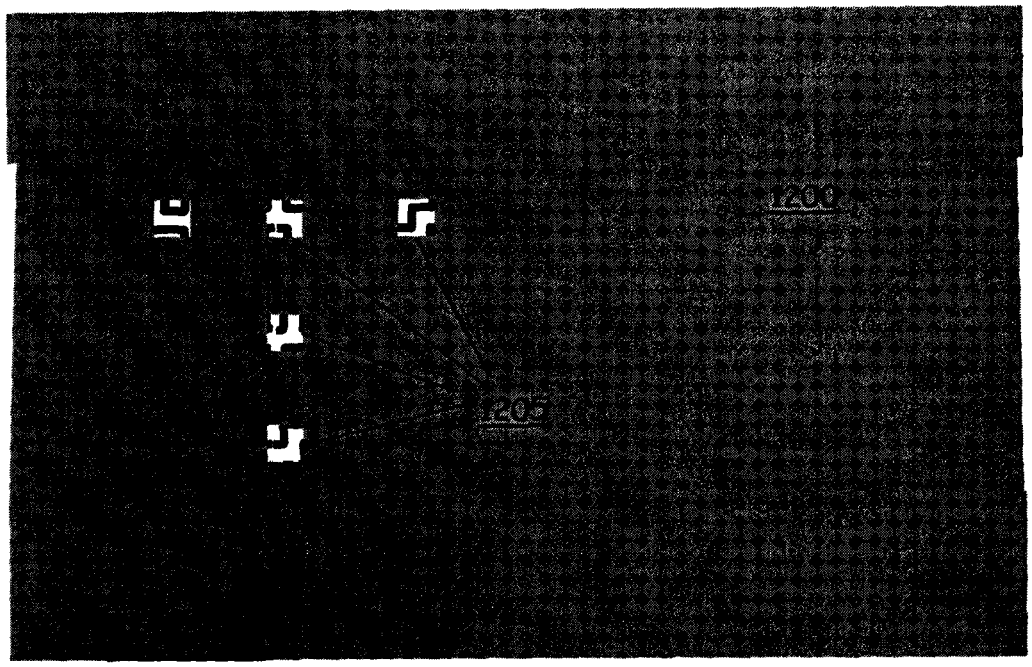
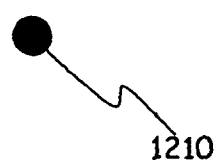
Fig. 12

TAMPER-PROOF STRUCTURES FOR PROTECTING ELECTRONIC MODULES

CROSS-REFERENCE TO RELATED APPLICATIONS

The present application claims the benefit of priority of European Patent Application No. EP06300572.2 filed Jun. 9, 2006 with the European Patent Office, the content of which is incorporated herein by reference in its entirety.

FIELD OF THE INVENTION

The present invention generally relates to electronic modules packaging, and particularly to secure electronic modules packages; more specifically, the invention relates to methods of forming tamper-proof structures adapted to protect electronic modules, particularly electronic modules intended for cryptographic applications implemented in data processing apparatuses and/or telecommunication systems.

BACKGROUND OF THE INVENTION

According to the Department of Commerce of the United States of America, secure cryptographic applications are classified according to one of four possible levels listed in the technical specification entitled "Security requirements for cryptographic modules", published in the Federal Information Processing Standards (FIPS) publication PUB 140-2 by the National Institute of Standards and Technology (NIST). This standard specifies the security requirements that must be satisfied by a cryptographic module intended to be utilized within a security system, protecting sensitive but unclassified information. The standard provides four increasing qualitative levels of security ("Level 1", "Level 2", "Level 3" and "Level 4") that are intended to cover a wide range of potential applications and environments in which cryptographic modules may be used.

Packages for electronic modules to be used for FIPS-certified cryptographic applications have a very important function beyond the classical mechanical protection function for the embedded semiconductor devices. They ultimately need to ensure the security and secrecy of the cryptographic keys and algorithm stored within the electronic module.

One of the requirements of the highest level of security (Level 4) of the FIPS PUB 140-2 standard is the capability to detect and respond to physical intrusion attempts. Such security is provided, in particular, by using tamper-proof structures or protection structures, that should be adapted to prevent the undetected penetration into the electronic module of microprobes that can be used to fraudulently read information from outside of the secure boundaries of the electronic module package.

Basically, tamper-proof structures comprise a sequence of tamper-proof layers, possibly formed with a combination of different techniques and having similar or different properties, adapted to allow detection of tamper attempts by an electronic monitoring system. When such an event is sensed, a security control system disables the module, clearing all sensitive information stored in a (e.g., volatile) memory within the electronic module housed within the package.

Tamper-proof structures may for example be associated with Printed Circuit Boards (PCBs) and PCB stack-ups, Single-Chip Modules (SCMs), Multi-Chip Modules (MCMs), semiconductor devices and Integrated Circuits (ICs), Micro Electro-Mechanical Systems (MEMS) and Micro Opto-Electro-Mechanical Systems (MOEMS), just to cite a few.

From the security point of view, the tamper-proof structures implement electrical circuits, and the tamper attempts are detected when the circuits change their electrical properties departing from a balanced and characterized level; the change in the electrical properties is typically caused by an electrical short circuit or open circuit. The tamper-proof structures are capable of preventing the creation of holes, aimed at introducing electrical microprobes, made by techniques such as micro-drilling with ceramic drills or laser and selective layer ablation. The tamper-proof layers may also be designed in such a way that it is difficult to work with them, for example due to intrinsic material/layer fragility when tampered (very low thickness, brittle layers, not solderable), so as to prevent shunting of the electrical circuit.

In order to limit the power consumption of the electronic modules, for example to preserve and to extend the life of the battery back-ups, the circuits implemented by the tamper-proof structures are preferably made of highly resistive conductive materials, sinking low currents; the use of low resistance conductive lines, which would sustain relatively high currents, would indeed cause a fast draining of the batteries forming the power supply of the electronic module.

The construction of these kinds of secure electronic modules can exploit several manufacturing steps normally available to some manufacturers, which can be tuned or updated so as to define the special features that are relevant in meeting specifics security needs.

The construction of the tamper-proof structures takes advantage of the different possible combinations of stacking of several tamper-proof layers for meeting the different levels of security for more generic commercial applications beyond the FIPS requirements.

A conventional approach to create a tamper-proof structure for an electronic module calls for implementing long linear circuits, in the form of conductive traces, having different directions (usually placed orthogonally to each other) formed in two or more different overlapping layers; in this way, a sort of fence is created over the electronic module, or part thereof, to be protected. Such tamper proof layers are for example described in the published U.S. patent application US-A-2006/0086534.

For example, FIG. 1 pictorially shows a tamper proof layer combined with a PCB. An electronic module package, denoted 100 as a whole, comprises a PCB 105 carrying electronic devices or chips 110-1 and 110-2, a volatile memory 115 wherein sensitive information to be protected against fraudulent tampering is stored, and a battery 120. The PCB 105 is insulated by a dielectric layer 125, on top of which conductive tracks 135 are formed in a conductive layer 130. Likewise, the conductive layer 130 is insulated by a dielectric layer 140, on top of which conductive tracks 150 are formed in a conductive layer 145. The conductive layer 145 is protected by the dielectric layer 155. According to this system, an electrical short-circuit is established between the conductive tracks 135 and 150 when inserting a conductive microprobe in a hole drilled into the layers 155 to 125, as depicted by arrows 160. The use of wires 165-1 and 165-2, combined with battery 120, allows to reset the volatile memory 115 when the short-circuit occurs, so as to erase sensitive information contained therein.

In order to detect a tamper attempt done with insulated tools, the conductive tracks 135 and 150 are generally very small in dimensions (line width and gaps between lines) and designed according to schemes similar to the one presented in FIG. 2, wherein an open circuit can be detected.

In the above-cited US-A-2006/0086534, it is stated that improvements in the security level are obtained in creating a non-predictable pattern of the secure tamper matrix, such as even if a localized analysis is done, it cannot effectively predict the pattern in a nearby area as well. To this purpose, changes in direction of the line pattern deviating from repetitive and constant pattern configurations are proposed, as illustrated in FIG. 5 of the cited document, wherein two close-by lines are part of the same net but in very distant positions from the resistive value.

SUMMARY OF THE INVENTION

The Applicant has observed that current designs of tamper-proof structures are not satisfactory.

As mentioned above, parallel conductive lines are conventionally used to create sort of two-dimensional fences. Parallel conductive lines present gaps between adjacent lines, thus groups of parallel lines are overlapped orthogonally to one another, using different stacked-up layers, so as to close those gaps and reduce the overall minimum space available to create a hole without making the tamper sensor to detect that. However, a single line position/path/direction belonging to a bundle of parallel lines, once identified, makes the whole pattern of lines predictable, and may allow a hacker getting the information needed to deduce the scheme of the tamper-proof structure. Once this happens, it becomes easier to carry out a tamper attempt.

In other words, a hacker, planning a tamper attack against a protected electronic module, may find the conventional tamper-proof structures, made up of stacked layers of orthogonally-placed groups of parallel conductive tracks, predictable in the likelihood of the expected relative positions of the tracks. Prediction of the position of the conductive tracks belonging to the tamper-proof structure can derive from reverse (destructive) analysis or from "lucky" localized inspection of very small defects that exposes the pattern. Once the position of few tracks, possibly of even one single track is determined, it is feasible to extrapolate the spatial positioning of the other tracks.

Furthermore, due to the limitation of the bi-dimensional constraint of a geometrical plane, neighboring parallel traces may also be in close "proximity" from the "electrical length" standpoint: a successful shunt between two such adjacent conductive lines may thus create a relatively large gap into the security fence.

The above problems also affect the pattern proposed in the above-cited US-A-2006/0086534, because the degree of unpredictability of the pattern of lines is rather low.

In view of the state of the art outlined in the foregoing, the Applicant has tackled the problem of how to improve the robustness of tamper-proof structures designed to protect electronic modules, particularly intended for cryptographic applications.

In particular, the Applicant has tackled the problem of how to design a really unpredictable, or very hardly predictable pattern of signal lines adapted to be embedded in a tamper-proof structure.

The Applicant has found that highly unpredictable patterns of signal lines can be obtained exploiting the concept and the properties of mathematical entities known as space-filling curves.

According to an aspect of the present invention, a tamper-proof structure as set forth in the appended claim 1 is provided, adapted to protect an electronic module, said tamper-proof structure including a pattern of signal lines having a highly unpredictable layout, which is an approximation of a space-filling curve obtained by the replication of at least one elementary space element having an inscribed base curve inscribed therein, wherein the base curve is adapted, by replication of the elementary space element, to generate an approximation of an at least two-dimensional space-filling curve; said replication is such that an end of the base curve in one elementary space element is connected to the end of the base curve in another, adjacent elementary space element of the replication.

According to another aspect of the present invention, a method of forming a tamper-proof structure is provided.

The tamper-proof structures according to the present invention, realized replicating specifically engineered/designed building blocks with an inscribed base curve layout to essentially fill, i.e. completely cover a specific area, embed matrices of signal lines built by signal lines placed in an essentially random order. This greatly increases the robustness of the tamper-proof structure against attacks perpetrated by hackers. For example, a successful shunt across two adjacent lines of the matrix does not jeopardize the effectiveness of the tamper-proof structure as a whole, contrary to what happens conventionally; this is due to the fact that the signal lines that are far from the shunt location moves in completely different directions.

The resulting signal lines pattern thus has a pseudo-random layout, that makes the prediction of the likelihood of the positioning of the signal line in any specific location basically impossible.

BRIEF DESCRIPTION OF THE DRAWINGS

The features and advantages of the present invention will be best understood reading the following detailed description of some embodiments thereof, provided merely by way of non-limitative examples, description that will be conducted making reference to the annexed drawings, wherein:

FIG. 6 illustrates an exemplary approximation of a space-filling curve obtained replicating the basic building block of FIG. 4 (and its rotated/mirrored versions, some of which are depicted in FIGS. 5A to 5E);

FIG. 7 shows a mapping of a plane using the basic building block of FIG. 3, and an advantageous labeling convention adopted for labeling the boxes that make up the basic building block of FIG. 3;

FIGS. 8A to 8C illustrates three examples of other base curves, having different layouts, than can be inscribed in the basic building block of FIG. 3;

FIG. 12 schematically depicts vane tamper attempts made by a hypothetical hacker against a tamper-proof structure including a pattern of signal lines with the layout depicted in FIG. 11;

DETAILED DESCRIPTION OF THE PREFERRED EMBODIMENT(S)

Figure 1:
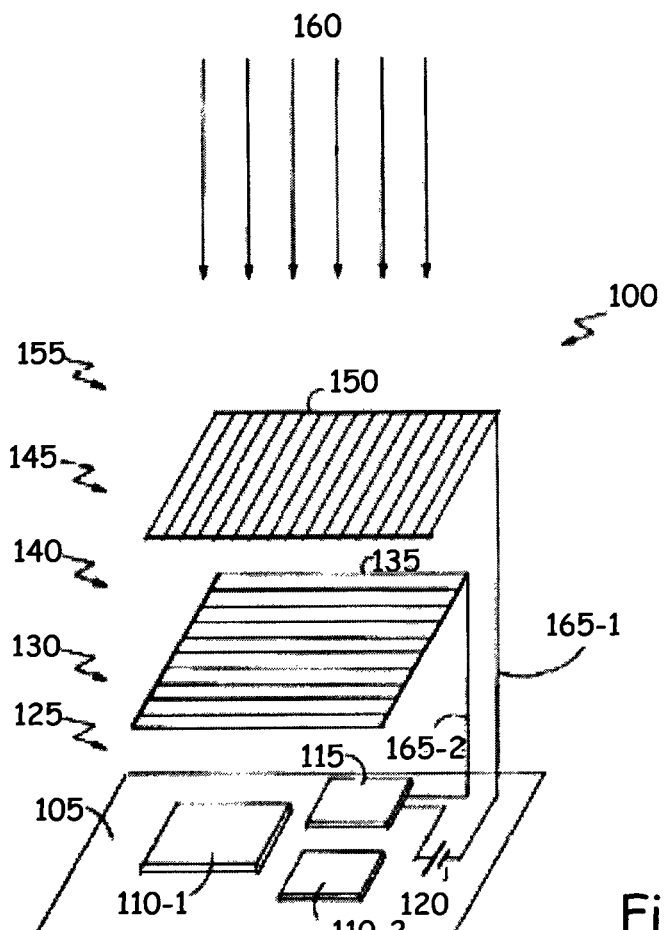
FIG. 1 is a partial perspective view of an electronic module package comprising tamper-proof layers.
Figure 2:
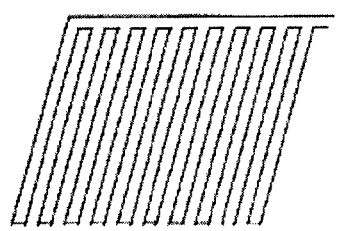
FIG. 2 illustrates a conventional conductive tracks design of the tamper-proof layer of FIG. 1, intended to allow the detection of tamper attempts.

As discussed in the foregoing, conventional approaches adopted in the design of tamper-proof structures calls for using pluralities of linear, parallel and relatively long lines of electrically conductive material, possibly providing two or more stacked-up layers of such conductive lines, with the lines in one layer extending orthogonally with respect to the lines in the other layer, as depicted in FIGS. 1 and 2 described in the foregoing.

The conductive line patterns obtained in the conventional way are highly predictable, and as such they are not very robust against tampering attacks.

According to the present invention, the concepts and properties of mathematical entities known as space-filling curves are exploited in order to design highly-unpredictable patterns of signal lines that are adapted to create robust tamper-proof fences to be embedded in tamper-proof structures for, e.g., electronic modules packages.

From the mathematical viewpoint, an N-dimensional space-filling curve can be defined as a continuous, surjective function from the unit interval [0, 1] of the set of real numbers to the N-dimensional unit hypercube. In particular, a 2-dimensional space-filling curve is a continuous curve that passes through every point of the unit square.

A space-filling curve is typically defined as the limit of a sequence of intermediate curves that are for example obtained by iteration; each of said intermediate curve can be seen as an approximation of the space-filling curve (the approximation becomes better and better as the iteration proceeds).

According to the present invention, tamper-proof structures embedding patterns of signal lines whose layout is an approximation (e.g., to a predetermined degree) of a space-filling curve are provided.

Thus, for the purposes of the present description, hereinafter by the term space-filling curve there is also meant an approximation of the real space-filling curve.

According to the present invention, the space-filling curve representing the layout of the desired signal line pattern to be embedded in the tamper-proof structure for the desired electronic module is obtained by replication (and, possibly, combination) of (one or more) basic building blocks, each one having inscribed therein a base curve, as described in detail hereinbelow.

Figure 3:
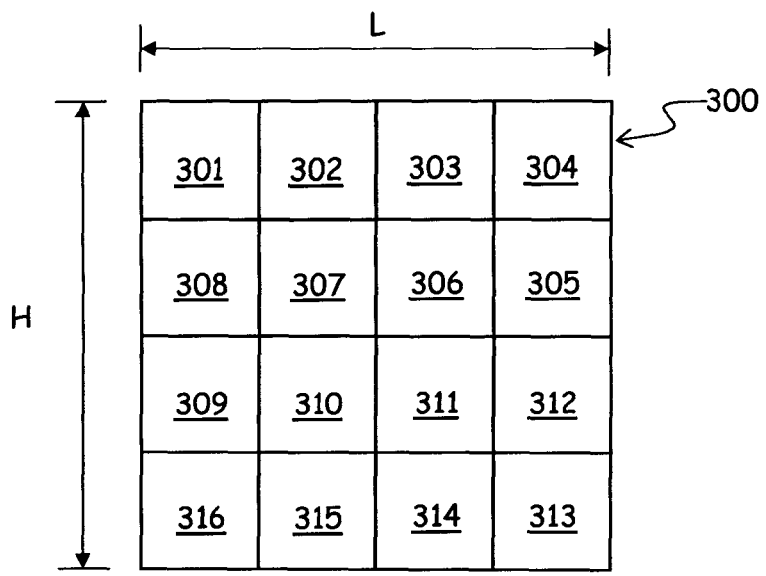
FIG. 3 illustrates an exemplary basic building block used for the construction of an approximation of a space-filling curve, which, according to the present invention, is exploited for creating a pattern of signal lines embedded in a tamper-proof structure.

Making reference to FIG. 3, an exemplary, non-limitative basic building block according to an embodiment of the present invention is depicted. The basic building block, denoted as a whole with the reference numeral 300, represents the elementary portion of space that is chosen to simulate the entire space to be filled by the space-filling curve (or by an approximation thereof) to be built; in particular, in the example herein considered, the space to be filled by the space-filling curve is a 2-dimensional space, particularly a plane, and the basic building block 300 is thus 2-dimensional.

In the example shown in FIG. 3, the basic building block 300 is a 4×4 matrix of square boxes 301, . . . , 316. It is pointed out that the size of the matrix is not per-se limitative for the present invention: smaller or larger matrices of square boxes may be adopted, for example 2×2 matrices; however, as it will be appreciated, the complexity, and thus the unpredictability of the layout of the patterns of signal lines that can be generated, depends, and particularly increases with the matrix size.

It is underlined that the basic building block 300 can be regarded as an entity not having predetermined physical dimensions (length L and height H); the actual dimensions of the basic building block 300 will depend on the specific practical application and technology adopted for realizing the tamper-proof structure (e.g., integration with an IC rather than into a PCB); in other words, the length L and the height H are parameters that may take different values depending on the specific application context.

A base curve inscribed within the basic building block 300 is selected. The base curve inscribed in the basic building block 300 represents an elementary space-filling curve element from which a space-filling curve (in the two-dimensional case herein considered, a plane-filling curve) can be generated, by repetition.

In particular, a base curve is chosen among the curves inscribed in the basic building block 300 and that satisfy a predetermined set of rules; for example, the rules to be satisfied may be the following:

a) the base curve passes through every box of the basic building block 300;

b) the base curve does not intersect with itself; and c) the base curve has a first and a second ends, respectively located in a first and a second boxes among the square boxes 301, . . . , 316 and terminating on the boundary of the basic building block 300; such first and a second boxes may in particular be regarded as entry and exit boxes into/from the basic building block 300, and this allows establishing a direction on the base curve.

Figure 4:
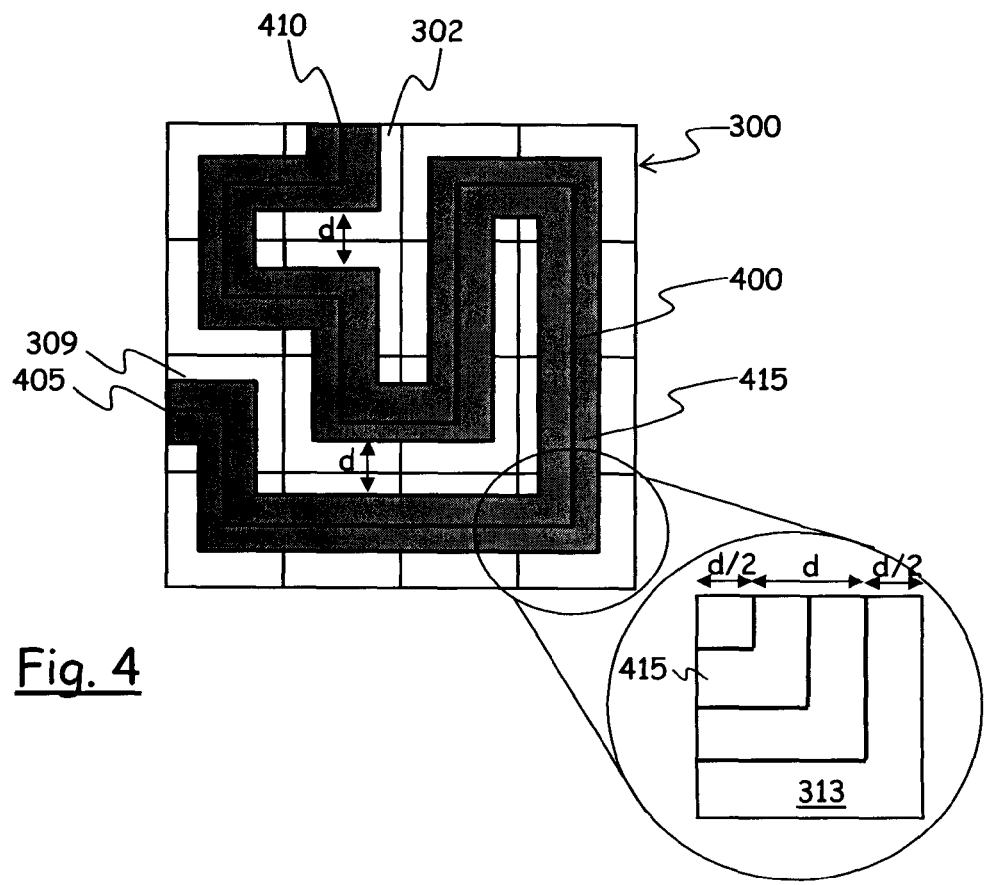
FIG. 4 illustrates the exemplary basic building block of FIG. 3 with an inscribed base curve used for the construction of said approximation of a space-filling curve.
Figure 5:
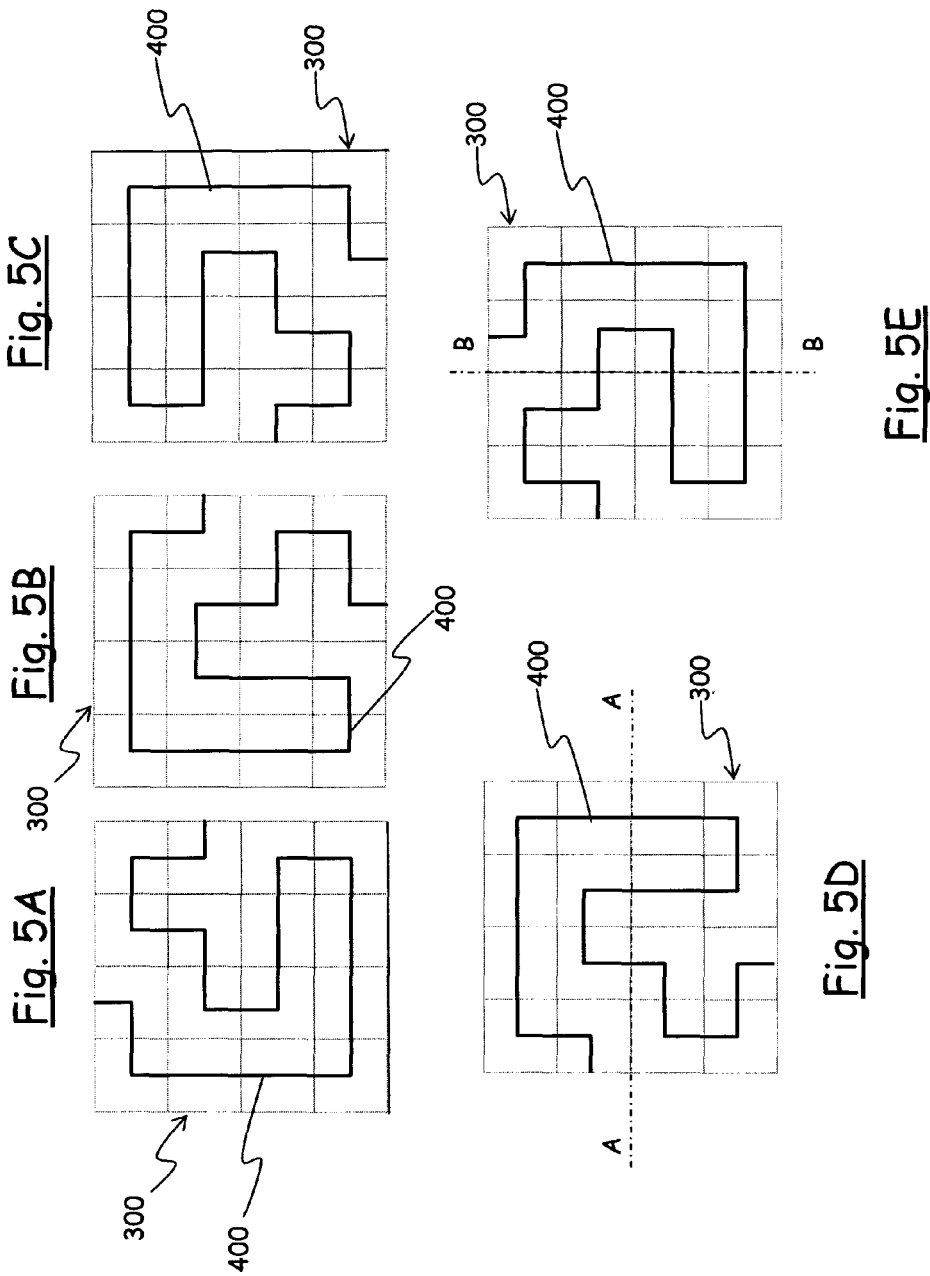
FIGS. 5A to 5E illustrate rotated and/or mirrored versions of the exemplary basic building block with the inscribed base curve of FIG. 4.

In FIG. 4, an example of a base curve 400 inscribed within the basic building block 300 of FIG. 3 is depicted.

The base curve 400 satisfies the rules set forth above, and has a first end 405 located in the entry box 309, and a second end 410 located in the exit box 302 of the basic building block 300.

It is pointed out that different set of rules may be adopted to define the base curve; for example, the condition that the base curve passes through every box of the basic building block may be replaced (relaxed) by a condition that the base curve passes through at least a predetermined number of boxes of the basic building block. In mathematics, several different space-filling curves are known, like the Peano curve, the Hilbert curve, the Sierpinsky curve; for each of them, a base curve can be defined such that, by proper replication, an approximation of the respective space-filling curve is obtained.

In FIG. 4, a shaded strip 415 schematically represents a possible, practical design rule for the physical implementation of the base curve 400. As depicted in the enlarged detail of FIG. 4, related to the portion of base curve passing through the square box 313 of the base building block 300, the strip 415, representing for example the target physical layout for a conductive material strip formed, e.g., in a conductive layer or a semiconductor IC, is for example designed according to a "half-full-half" design rule, which means that the width d of the strip 415 is half the length of the generic square box 301, . . . , 316, and the distance of the generic edge of the strip 415 from a corresponding edge of the generic square box 301, . . . , 316 is half the strip width d. Following this rule, the strip 415 is everywhere, i.e. on each side thereof surrounded by a free space at least equal to its width d. This design rule is for example suitable for tamper-proof structures to be embedded in PCBs.

For the practical implementation, the dimensions (height H and length L) of the basic building block 300 can be scaled down to the minimum dimensions such that the dimension d corresponds to the minimum feature size allowed by the technology adopted for fabricating the tamper-proof structure. Thus, a design for a pattern of signal lines embedded in a tamper-proof layer fabricated using a certain technology may be reused in a different technology, simply scaling the dimensions of the basic building block based on the different technology potential.

As mentioned above, an approximation of a space-filling curve can be generated by replicating the basic building block 300 with the inscribed base curve, like for example the base curve 400, properly rotating and/or mirroring the base curve 400 inscribed within the basic building block 300, so that the ends of the curve 400 inscribed in the generic basic building block 300 join to the ends of the curve 400 inscribed in the adjacent basic building block 300. FIGS. 5A to 5D show for example the basic building block 300 with the inscribed base curve 400 of FIG. 4 rotated of 90°, 180° and 270°, and mirrored around an axis denoted A in FIG. 5D. FIG. 5E shows again the basic building block 300, with the inscribed base curve 400 mirrored around the axis denoted B with respect to the rotated version of FIG. 5A. Similarly, other versions of the basic building block 300 with the inscribed base curve 400 may be obtained by mirroring/rotating the base curve. FIG. 6 shows an example of a continuous curve 600 obtained replicating (and properly rotating and/or mirroring) the base curve 400 inscribed in the basic building block 300, so as to arrange ten basic building blocks 300 in two rows of five basic building blocks 300 each.

A convenient way to describe a generic base curve inscribed within the basic building block, like the basic building block 300, and the rotated/mirrored versions of the inscribed base curve, is to assign an arbitrary but unique label to each square box of the matrix forming the basic building block. By way of example, the square boxes 301, . . . , 316 of the basic building block 300 may be assigned the labels 1, 2, 3, 4, 5, 6, 7, 8, 9, 10, 11, 12, 13, 14, 15 and 16, respectively. The base curve 400 depicted in FIG. 4 may thus be fully described by the following string (starting from the entry box):

{9,16,15,14,13,12,5,4,3,6,11,10,7,8,1,2}.

It can be appreciated that the above string completely defines the path followed by the base curve within the basic building block from the entry box (labeled 9) to the exit box (labeled 16). The roles of entry and exit boxes is merely a convention, and may be changed, so that the box 302 may be the entry box, and the box 309 may be the exit box; in such a case, the same path would be followed in reverse direction, and the sequence above would be reversed.

In general, a base curve satisfying the conditions a) and b) above can be described by a string of labels equal in number to the number of boxes making up the basic building block (sixteen in the example herein considered of a basic building block being as 4×4 matrix), and wherein the generic label is never repeated. Expediently, a basic building block being a 4×4 matrix of square boxes can also be represented easily with only 4 bits (0000 to 1111), or by hexadecimal single units (0-9, a-f); these types of coding are particularly advantageous for an implementation of an software algorithm for the automated generation of space-filling curves defining patterns of lines for tamper-proof structures; however, other types of coding may be exploited, the specific coding type being not limitative for the present invention.

With such an assignment of labels to the individual boxes of the basic building block, it is also possible to describe, using simple strings of labels similar to the string above, a curve obtained by replicating the basic building block. In FIG. 7 the replication of eight basic building blocks 300 of the type shown in FIG. 3 is depicted, merely by way of example; the individual square boxes 301, . . . , 316 of each basic building block are labeled according to the exemplary scheme described above, and all the basic building blocks are oriented in the same way, with the box 301 (labeled 1) in the upper-left corner. It can be appreciated that, taken the generic square box 301, . . . , 316, the adjacency relationships with other square boxes (belonging to the same or to different basic building blocks) are uniquely determined; for example, the box labeled 13 of the generic basic building block may only be adjacent to the box labeled 1 of a first adjacent basic building block, and to the box labeled 16 of a second adjacent basic building block, under the assumption that the diagonal path is not allowed (thus, the adjacency with a box labeled 1 is not considered). A generic curve being an approximation of a space-filling curve inscribed within the eight basic building blocks of FIG. 7, i.e. a curve obtained by replicating a base curve inscribed in a basic building block, may be described by a string of labels, each label corresponding to a unique square box of a unique basic building block. It can be appreciated that, under the above labeling and orientation assumption, rotated and/or mirrored versions of a same base curve, like the versions depicted in FIGS. 5A to 5E of the base curve 400 of FIG. 4, have ends located in different entry and exit boxes.

For example, making reference to the curve 600 depicted in FIG. 6, and labeling the square boxes of the ten basic building blocks that make up the curve 600 as shown in FIG. 7, the curve 600 is fully described by the following string:
{8,1,2,3,4,5,12,13,14,11,6,7,10,9,16,15,2,1,8,9,16,15,14,
13,12,11,10,7,6,3,4,5,8,1,2,7,6,11,$\overline{10,9}$,16,15,14,13,12,5,
4,3,14,13,12,11,6,7,$\overline{10}$,15,16,9,8,1,2,3,4,5,8,1,2,3,4,5,12,
13,$\overline{14,1}$1,6,7,10,9,16,15,2,1,8,9,16,15,14,$\overline{13}$,12,11,10,7,6,
3,4,5,8,1,2,7,6,11,10,$\overline{9,16}$,15,14,13,12,5,4,3,14,13,12,11,
6,7,$\overline{10}$,15,16,9,8,1,2,3,4,5,8,1,2,3,4,5,12,13,$\overline{14,1}$1,6,7,1
0,9,16,15,2,1,8,9,16,15,$\overline{14,1}$3,12,11,10,7,6,3,4,5}
wherein the pairs of underlined labels correspond to connections between two consecutive basic building blocks (consecutive in the sense adopted by convention to follow to curve along its path). It can be appreciated that a "15,2" sequence corresponds to a north-south direction, whereas a "3,14" sequence corresponds to a west-east direction (assuming merely by way of convention that, in FIGS. 6 and 7, the north is up, the south is down, the east is at the right and the west is at the left). Under the above assumption of no diagonals, a sequence of labels like "13,1" or "1,13" is forbidden).

Figure 9:
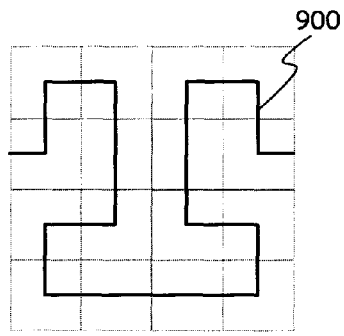
FIG. 9 illustrates an exemplary symmetric base curve inscribed in the basic building block of FIG. 3.

The base curve 400 shown in FIG. 4 is an example of asymmetric base curve; an asymmetric base curve is a base curve having the first and second ends located in entry and exit boxes of the basic building block wherein it is inscribed that are not aligned along a direction parallel to any symmetry axis of the basic building block. Other examples of asymmetric base curves that satisfy the conditions a), b) and c) above are the curves 800a, 800b and 800c depicted in FIGS. 8A, 8B and 8C. A symmetric base curve is instead a base curve having the first and second ends located in entry and exit boxes of the basic building block wherein it is inscribed that are aligned along a direction parallel to a symmetry axis of the basic building block. An example of symmetric base curve is the base curve 900 depicted in FIG. 9.

Figure 10:
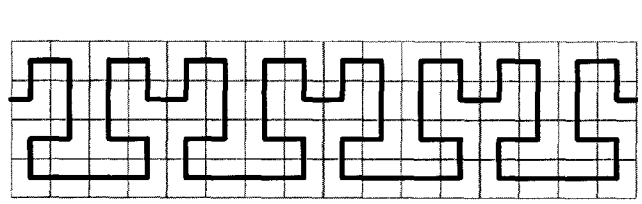
FIG. 10 illustrates a curve obtained by replicating the basic building with the inscribed base curve of FIG. 9.

Basic building blocks having inscribed therein symmetric base curves, when replicated may give rise to chains that extend along the direction of the symmetry axis to indefinite lengths, as depicted in FIG. 10. The resulting pattern is, to a certain degree, predictable, and thus it is not particularly suitable for the creation of robust tamper-proof structures. Differently, basic building blocks having inscribed therein asymmetric base curves, when replicated do not extend in a specific direction, and tend instead to propagate randomly in different directions of the plane (however, as discussed below, basic building blocks with symmetric inscribed base curves may be used in combination with basic building blocks having asymmetric inscribed base curves to create unpredictable patterns).

Preferably, arrangements of basic building blocks giving rise to curves having closed loops should be avoided.

Figure 11:
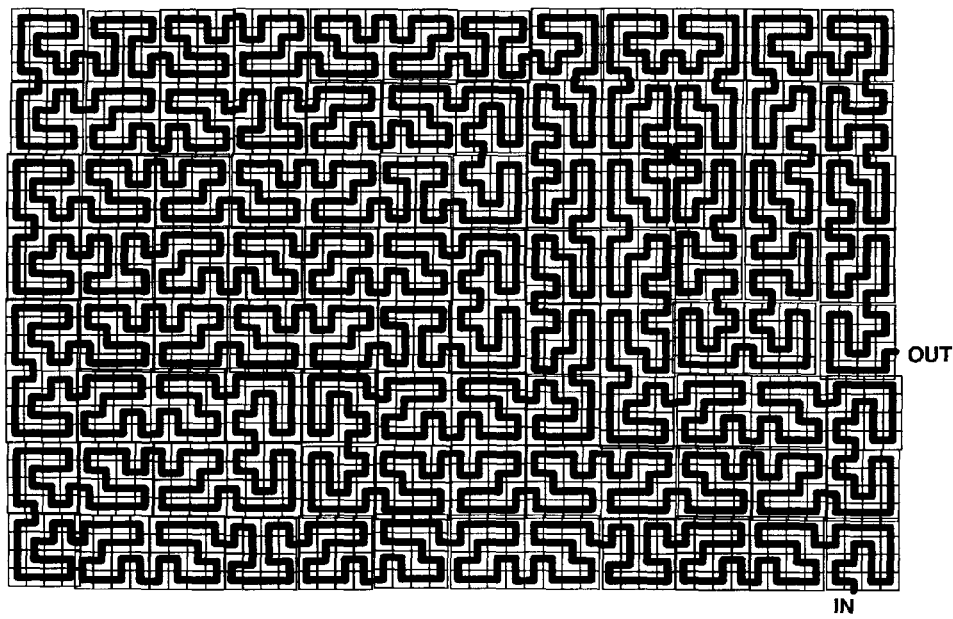
FIG. 11 illustrates an exemplary approximation of a two-dimensional space-filling curve suitable to be used for creating a pattern of signal lines embedded in a tamper-proof structure.

Basic building blocks having inscribed therein different types of base curves may also be combined in order to generate an approximation of a 2-dimensional space-filling curve. For example, FIG. 11 shows a curve 1100 being an approximation of a space-filling curve and generated by combining a plurality of basic building blocks 300 of the type shown in FIG. 3, i.e. made up of a 4×4 matrix of square boxes 301, . . . , 316, with inscribed four different types of base curves. In particular, basic building blocks 300 with inscribed therein the base curve 400 of FIG. 400 (and its rotated and/or mirrored versions, such as those depicted in FIGS. 5A to 5E), the base curves 800a, 800b and 800c of FIGS. 8A to 8C, the base curve 900 of FIG. 9 (and rotated and/or mirrored versions thereof). Expediently, adopting the labeling convention discussed in the foregoing, the complexity of the space-filling curve of FIG. 11 can be fully described by means of a simple string of labels, satisfying the predetermined rules of concatenation of the labels (like for example the "no diagonal" rule described above).

Thanks to the present invention, tamper-proof structures including patterns of signal lines having highly unpredictable layouts can be created; for example, referring to FIG. 12, there is schematically shown a hypothetical tamper-proof structure including the pattern of signal lines of FIG. 11, masked by a superimposed masking layer 1200 (like the dielectric layer 155 of FIG. 1); openings 1205 in the masking layer 1200 are also schematically shown, assumed to have been produced at different locations of the masking layer 1200 by a hypothetical hacker using a drill with a cross-section schematically indicated with 1210. It can be appreciated that, by inspecting through the openings 1205, it is hard, if not impossible for the hacker to get the knowledge of the layout of the underlying pattern of lines. The degree of security guaranteed by the tamper-proof layer is thus highly increased.

The pattern of signal lines to be embedded in the tamper-proof structure may be generated by means of an algorithm that, based on a predetermined basic building block with an inscribed base line, like for example the basic building block 300 with the inscribed base line 400, repeatedly, or on a set of basic building blocks, with different inscribed base lines, iteratively replicates the basic building block, possibly with rotated and/or mirrored versions of the inscribed base curve, i.e. adds at each iteration the one basic building block, joining the end of the base curve terminating at the exit box of a generic basic building block to the end of the base curve terminating at the entry box of the next added basic building block.

The adoption of the labeling described in the foregoing is an expedient way to describe the boxes, from the algorithmic viewpoint. For example, considering the basic building block 300 with the inscribed base curve 400, and referring to FIG. 6, let it be assumed that the starting basic building block for the generation of the two-dimensional space-filling curve is described by the string:

{8,1,2,3,4,5,12,13,14,11,6,7,10,9,16,15}, corresponding to the block 605 of FIG. 6. Assuming as before that no diagonal lines are allowed, the next basic building block to be added should have inscribed therein a suitably rotated and/or mirrored version of the base curve 400, such that the entry box is the box labeled 2, thus the algorithm selects, among all the possible rotated and/or mirrored versions of the base curve, that having the entry box located in the suitable position, in this example the block 610 of FIG. 6, which is described by the string:

{2,1,8,9,16,15,14,13,12,11,10,7,6,3,4,5}.

The next building block shall have the box 8 as the entry box, and so on, the process of choice and addition of the basic building blocks is iterated, until a suitable approximation of a two-dimensional space-filling curve is obtained.

By a similar technique, it is possible to generate three-dimensional tamper-proof structures, with three-dimensional patterns of lines that are not limited to a single plane.

One possible way to create a three-dimensional tamper-proof structure is to start generating a two-dimensional (plane) pattern of lines, using the technique described in the foregoing, and then to "fold" the generated plane pattern, along predetermined folding lines, so as to obtain a centrally-hollow three-dimensional structure. This method is exemplified in FIGS. 13A and 13B; specifically, in FIG. 13A an exemplary, simple plane pattern of lines formed by replicating six basic building blocks 1301, . . . , 1306, each being a building block 300 of FIG. 3, i.e., a 4×4 matrix of square boxes 301, . . . , 316, with inscribed the base line 400 of FIG. 4, and rotated/mirrored versions thereof, so as to form a continuous line 1309.

Figures 13A, 13B:
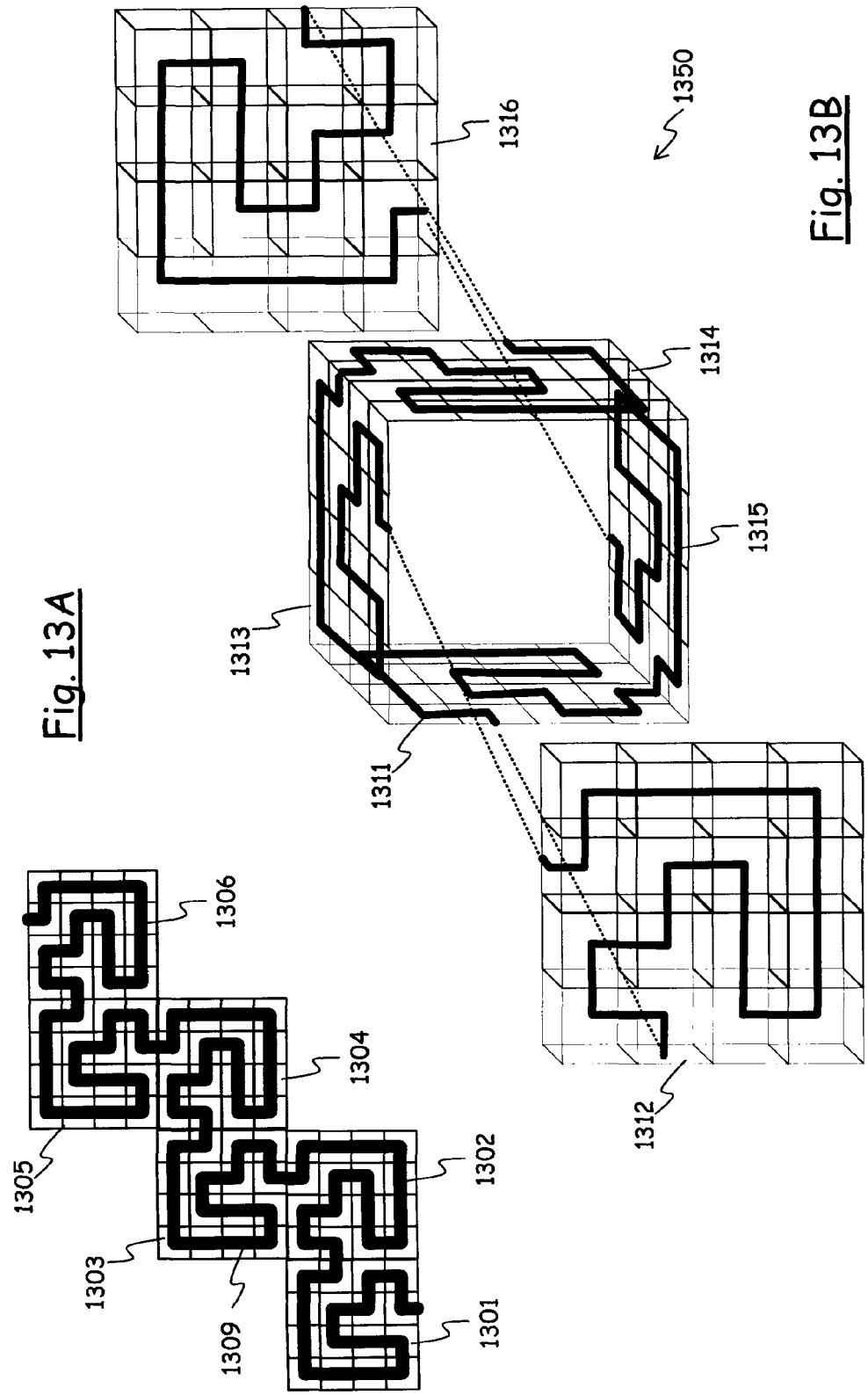
FIGS. 13A and 13B schematically illustrate a method for creating highly-unpredictable three-dimensional patterns of signal lines, according to an embodiment of the present invention.

The six basic building blocks 1301, . . . , 1306 are intended to form respective faces 1311, . . . , 1316 of a cube 1350, depicted in FIG. 13B in partially exploded view, for better clarity. In particular, the operation by which, from the planar pattern of FIG. 13A, the cube of FIG. 13B is obtained can be described as a folding of the planar structure along the lines of separation between the different basic building blocks 1301, . . . , 1306.

In this way, it is possible to create a tamper-proof structure including a shell with a highly unpredictable pattern of signal lines arranged thereon, suitable for example to create a tamper-proof shield around a three-dimensional object, like an electronic module placed within the shell.

It is pointed out that in the example of FIGS. 13A and 13B the generic face of the cube includes only one basic building block merely for simplicity of illustration; in general, every face of the cube may include a plurality of basic building blocks, as in the plane structures described in the foregoing.

Also, it is pointed out that the three-dimensional shells may include more than a single layer of signal lines.

Figure 14:
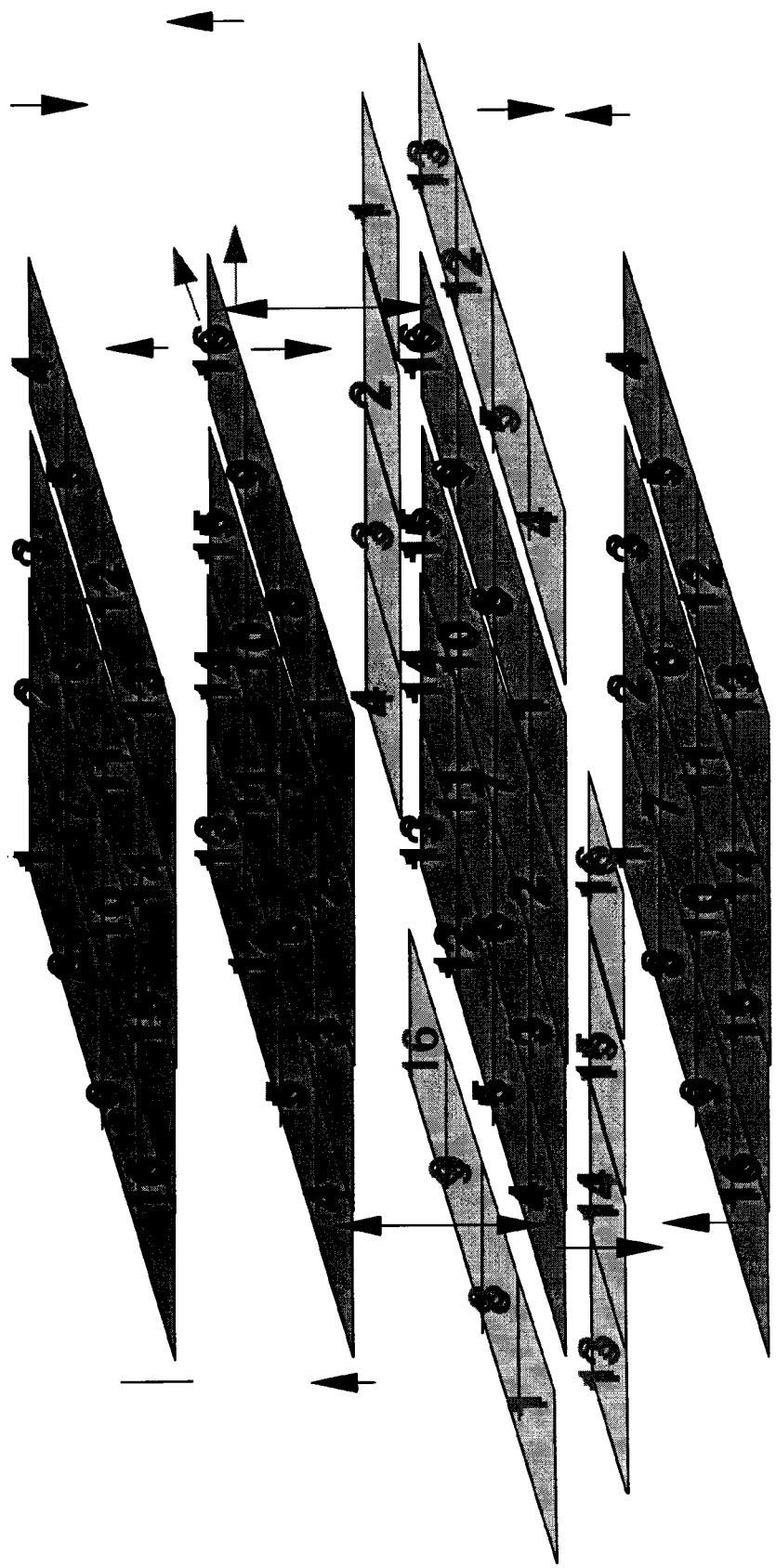
FIG. 14 illustrates another method to create highly-unpredictable three-dimensional patterns of signal lines, according to another embodiment of the present invention.

Another way to create a three-dimensional tamper-proof structure is depicted schematically in FIG. 14. In this case, two or more planes of basic building blocks are stacked up. In other words, assuming to use basic building blocks like the block 300 of FIG. 3, being a 4×4 matrix of square boxes, a single plane or portion of plane may be thought to be formed by tiles each one being a block 300, and two or more planes or portion of planes are stacked up. Adopting the box labeling scheme described in the foregoing, it is possible to describe not only the development of a curve on a plane or portion of plane, but also transitions from one plane to another, like in the case of the curve 1500 depicted in FIG. 15. The number of planes to be stacked up may be selected based on the target complexity of the pattern of signal lines to be realized.

Figure 15:
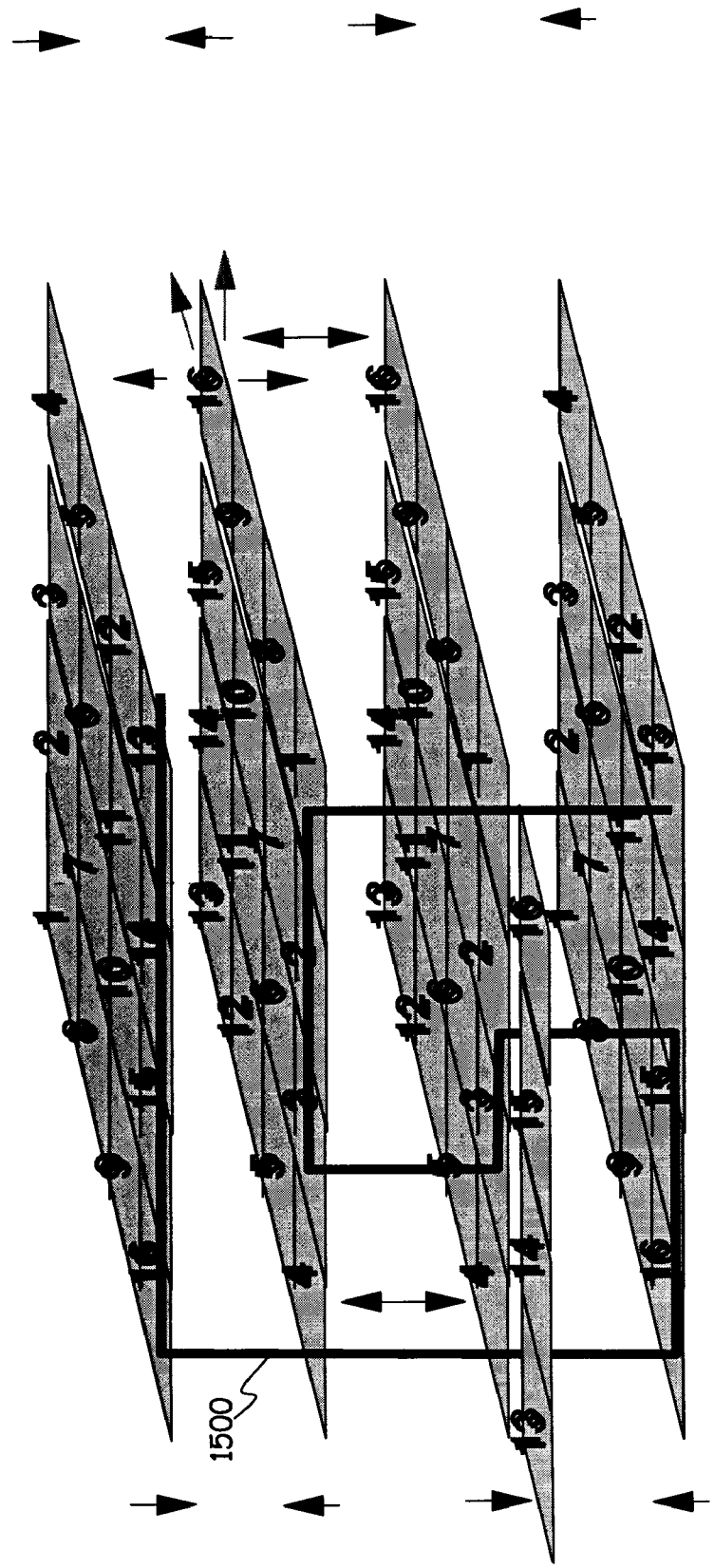
FIG. 15 illustrates, by means of a simple curve, an advantageous labeling convention for the boxes making up the basic building blocks in different planes.

Concerning the labeling of the boxes in a stacking-up of planes like that depicted in FIGS. 14 and 15, it is observed that in case only two planes are stacked-up, the two planes may have the same labeling rule (i.e., boxes labeled 1, 2, . . . , 16 in one plane are vertically superimposed by boxes labeled 1, 2, . . . , 16 in the other plane). In fact, in the description of the curve by means of strings of labels, sequences like (1,1) unequivocally mean a transition from one plane to another (because in a single plane no such sequence is possible).

In case of three or more planes, in order to ensure uniqueness and eliminate ambiguities, couples of planes should be rotated, from the viewpoint of the box labeling, of 180 degrees, as visible in FIGS. 14 and 15. In this example, the two square boxes making up the basic building blocks covering the planes 1505 and 1510 have the same labeling, whereas the square boxes making up the basic building blocks covering the planes 1515 and 1520 have a labeling that is rotated of 180 degrees with respect to that of the planes 1050 and 1510. In this way, a sequence like (4,4) means a transition from the plane 1505 to the plane 1510 (or vice versa); a sequence like (4,16) means a transition from the plane 1510 to the plane 1515, or, equivalently, from the plane 1505 to the plane 1520; a sequence like (16,4) means a transition from the plane 1515 to the plane 1510 or, equivalently, from the plane 1505 to the plane 1520. Thus, by keeping a runtime indication of which is the current plane, a string of labels provides an unambiguous description of a curve in the space. For example, the curve depicted in FIG. 15 may be described by the following string:

{13,1,1,2,3,3,2,14,15,16,4,4,16,15,14,13}.

Figure 16:
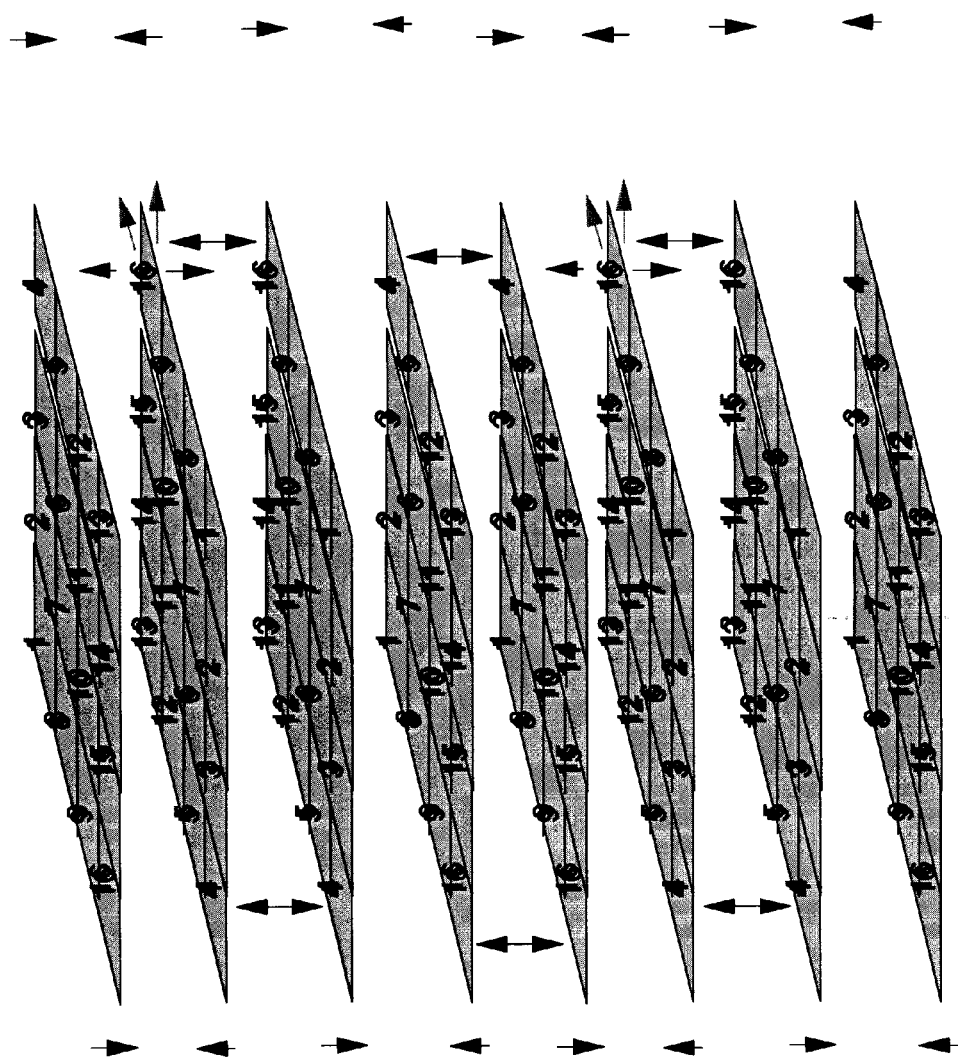
FIG. 16 illustrates a labeling convention to be adopted in a case more complex than that of FIG. 14.

FIG. 16 depicts the situation in the more complex case of a stacking of eight planes.

In the design of tamper-proof structures for electronic modules, two or more space-filling curves may be combined (i.e., curves generated by means of different algorithms, based on different basic building blocks and different base curves), so as to form an even more unpredictable layout of signal lines.

The method according to the present invention may be exploited to design tamper-proof structures adapted to protect semiconductor ICs or parts thereof, SCMs, MCMs, MEMS, MOEMS.

From the practical manufacturing viewpoint, the tamper-proof structures according to the present invention may be realized by means of the techniques described in the above-cited US-A-2006/0086534, which is incorporated herein by reference. In particular, the tamper-proof structures according to the present invention may be integrated in ICs, PCBs (laminates), thin-film circuits. The patterns of signal lines may be formed by etching of material layers, machining, photo-imaging processes, printing, chemical deposition, laser scribing/etching, electro-erosion, laser assisted deposition, ion beam assisted deposition, sputter deposition and molecular beam deposition and the like; the specific method adopted for forming the desired patterns of signal lines to be embedded in the tamper-proof structure is not per-se limitative.

The present invention has been here disclosed and described by means of some possible embodiments thereof; however, those skilled in the art will be able to find new embodiments and/or to devise modifications to the described embodiments of the invention, for example for satisfying specific and contingent needs, without for this reason departing from the scope of the invention, defined in the appended claims.

What is claimed is:

1. A tamper-proof structure for protecting an electronic module, the tamper-proof structure comprising a pattern of signal lines having a highly unpredictable layout, characterized in that said layout is an approximation of a space-filling curve obtained by the replication of at least one elementary space element (300) having an inscribed base curve (400) inscribed therein, wherein the base curve is adapted, by replication of the elementary space element, to generate an approximation of an at least two-dimensional space-filling curve, said replication being such that an end of the base curve in one elementary space element is connected to the end of the base curve in another, adjacent elementary space element of the replication.

2. The tamper-proof structure of claim 1, wherein said space-filling curve is one of a Peano curve, a Hilbert curve, and a Sierpinsky curve.

3. The tamper-proof structure of claim 1, wherein said elementary space element is formed of a plurality of sub-elements (301-316).

4. The tamper-proof structure of claim 3, wherein said sub-elements are squares, in a two-dimensional arrangement.

5. The tamper-proof structure of claim 2, wherein said replication of the at least one elementary space element includes at least one elementary space element with inscribed 90-degree rotated version of the base curve.

6. The tamper-proof structure of claim 5, wherein said replication of the at least one space element lies at least on a plane.

7. The tamper-proof structure of claim 1, wherein said at least one elementary space element includes at least two elementary space elements with respective base curves inscribed therein, and said replication includes elementary space elements selected among the at least two elementary space elements, having inscribed therein the respective base curve and rotated and/or mirrored versions thereof.

8. The tamper-proof structure of claim 6, comprising a three-dimensional structure formed by a folded planar structure obtained by said replication of the elementary space elements on a plane.

9. The tamper-proof structure of claim 1, wherein said replication develops in a three-dimensional space.

10. The tamper-proof structure of claim 1, wherein said signal lines are formed by means of at least one technique selected from the group consisting of: etching of material layers, machining, photo-imaging, printing, chemical deposition, laser scribing, laser etching, electro-erosion, laser assisted deposition, ion beam assisted deposition, sputter deposition, and molecular beam deposition.

11. The tamper-proof structure of claim 1, wherein said electronic module is selected from the group consisting of: Printed Circuit Boards (PCBs) and PCB stack-ups, Single-Chip Modules (SCMs), Multi-Chip Modules (MCMs), semiconductor devices and Integrated Circuits (ICs), Micro Electro-Mechanical Systems (MEMS) and Micro Opto-Electro-Mechanical Systems (MOEMS).

* * * * *